United States Patent
Raaymakers et al.

(10) Patent No.: US 7,221,627 B2
(45) Date of Patent: May 22, 2007

(54) OPTICAL DEVICE FOR READING INFORMATION

(75) Inventors: Jeroen Arnoldus Leonardus Johannes Raaymakers, Eindhoven (NL); Herman Petrus Van Der Kall, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 507 days.

(21) Appl. No.: 10/498,763

(22) PCT Filed: Dec. 11, 2002

(86) PCT No.: PCT/IB02/05359

§ 371 (c)(1),
(2), (4) Date: Jun. 15, 2004

(87) PCT Pub. No.: WO03/052753

PCT Pub. Date: Jun. 26, 2003

(65) Prior Publication Data

US 2005/0122858 A1    Jun. 9, 2005

(30) Foreign Application Priority Data

Dec. 19, 2001 (EP) .................................. 01205009

(51) Int. Cl.
*G11B 7/00* (2006.01)
(52) U.S. Cl. .................... 369/44.28; 369/100
(58) Field of Classification Search ................. 369/100
See application file for complete search history.

(56) References Cited

U.S. PATENT DOCUMENTS

| | | | | |
|---|---|---|---|---|
| 4,151,570 A | * | 4/1979 | Ravizza et al. .......... | 360/77.17 |
| 4,536,809 A | * | 8/1985 | Sidman .................... | 360/77.04 |
| 4,628,239 A | * | 12/1986 | Everett, Jr. ................. | 318/685 |
| 5,479,388 A | * | 12/1995 | Gondou et al. .......... | 369/47.25 |
| 5,940,239 A | * | 8/1999 | Lee et al. ................ | 360/77.02 |
| 5,970,033 A | * | 10/1999 | Nakano et al. .......... | 369/44.29 |
| 6,671,120 B2 | * | 12/2003 | Koganezawa et al. ... | 360/78.05 |

* cited by examiner

*Primary Examiner*—Gautam R. Patel
(74) *Attorney, Agent, or Firm*—Michael E. Belk

(57) ABSTRACT

An optical playback or recording device is equipped with mass-unbalance detection means (20) for detecting unbalance on the record carrier (2). Mass-unbalance causes vibration and sound in the optical device when the record carrier (2) is rotated at a relatively high speed. When mass-unbalance is detected, the speed may be reduced to reduce the vibration and sound in the optical device. The mass-unbalance detection means (20) performs the following steps to detect mass-unbalance: a) determining the maximum value $U_{max1}$ of the actuator control signal (AS) at a rotational speed $\Omega_1$; b) determining the maximum value $U_{max2}$ of the actuator control signal (AS) at a rotational speed $\Omega_2$; c) comparing Formula (I) with Formula (II). If these values are substantially equal, then the effect of mass-unbalance is small, otherwise the effect of mass-unbalance is too great and the speed may have to be reduced $$\frac{U_{max1}}{\omega_1^2} \text{ with } \frac{U_{max2}}{\omega_2^2}. \quad (I)$$

4 Claims, 3 Drawing Sheets

OPTICAL DEVICE FOR READING INFORMATION

The invention relates to an optical device for reading information on a track on a surface of an optically readable information carrier to be accommodated in the device, the device comprising:

a rotation means for accommodating and rotating the information carrier with a rotational speed $\omega$, which rotational speed $\omega$ is dependent on a rotation control signal, a parameter p being proportional to the rotational speed $\omega$;

a rotation controller for controlling the rotational speed $\omega$ by driving the rotation control signal;

a radiation source for generating a radiation beam;

a carriage which can be moved in a first direction transverse to the track and along the surface;

an objective for focusing the radiation beam on the track, the objective being connected to the carriage;

an actuator for moving the objective relative to the carriage in the first direction in dependence on an actuator control signal which has an amplitude U;

a radial controller for keeping the radiation beam in position on the track in the first direction by generating the actuator control signal, the radial controller having a bandwidth $f_b$, and a detection means for determining a mass-unbalance of the information carrier.

An embodiment of this optical device is known from EP-A-0821356.

In this known optical device the mass-unbalance of the information carrier is detected by utilizing a tracking error signal or the rotation control signal. The amplitude of the tracking error signal indicates in how far the actual position of the radiation beam in the first direction deviates from a desired position.

If the mass of the information carrier is not homogeneously distributed relative to the center of rotation, mass-unbalance arises. When an information carrier having a mass-unbalance rotates at a high speed of approximately 6000 rpm, vibrations may arise. The distance from the part of the track where the radiation beam is incident up to the center of rotation may start to vary as a result of the vibrations. This may cause the amplitude of the tracking error signal to be greater than in an information carrier without mass-unbalance. The detection means of the known optical device detects when the absolute value of the amplitude of the tracking error signal exceeds a first given threshold. If the absolute value of the tracking error signal exceeds the first threshold, the information carrier may have mass-unbalance. The absolute value of the tracking error signal may, however, also exceed the first threshold, when the track is situated eccentrically around the center of rotation of the information carrier. Hereinafter sub-tracks will be discussed, a sub-track being a portion of the track that completely surrounds the center of the information carrier.

The known optical device has a hold state. This is a state in which part of the track is read repeatedly by repeatedly having the radiation beam jump back to a previous sub-track relative to the current sub-track. If the information carrier has a mass-unbalance, the amplitude of the rotation control signal exceeds that of an information carrier without mass-unbalance. The reason for this is that in case of mass-unbalance the information carrier does not rotate uniformly between the positions between which the radiation beam jumps. With the aid of the rotation control signal the rotation controller tries to eliminate the disturbance of the rotational speed $\omega$ caused by the mass-unbalance. As a result, the amplitude of the rotation control signal may be higher. The detection means of the known optical device detects when the absolute value of the amplitude of the rotation control signal exceeds a predefined second threshold. If the absolute value of the rotation control signal exceeds the second threshold, the information carrier may have mass-unbalance.

Other disturbances of the mass-unbalance may also influence the magnitude of the amplitude of the rotation control signals. Since the detection means of the known optical device compares these signals with predefined thresholds, it may thus happen that as a result of other disturbances one comes to the conclusion that the information carrier has mass-unbalance, whereas in reality this is not the case. The known optical device thus has the disadvantage that the detection of mass-unbalance is influenced by other disturbances.

It is an object of the invention to provide an optical device of the type defined in the opening paragraph in which the influence of other disturbances is suppressed when mass-unbalance is being detected.

With the optical device according to the invention, this object is achieved in that the detection means is capable of carrying out at least the following steps:

a) making the information carrier rotate at a rotational speed $\omega_1$ with the aid of the rotation means and having the radiation beam follow the track with the aid of the actuator and the carriage such that a maximum value $U_{max1}$ of the amplitude U occurs and the parameter p has a value $p_1$;

b) making the information carrier rotate at a rotational speed $\omega_2$ with the aid of the rotation means and having the radiation beam follow the track with the aid of the actuator and the carriage such that a maximum value $U_{max2}$ of the amplitude U occurs and the parameter p has a value $p_2$; and c) comparing a first quotient of $U_{max1}$ and $p_1^2$ with a second quotient of $U_{max2}$ and $p_2^2$ for determining the mass-unbalance.

It was found that with an information carrier without mass-unbalance the quotient of a maximum value $U_{max}$ and $\omega$ squared is approximately constant at various speeds of rotation $\omega$. If the quotient $$\frac{U_{max1}}{\omega_1^2}$$

approximately equals a value C, with an information carrier without mass-unbalance the quotient $$\frac{U_{max2}}{\omega_2^2}$$

also approximately equals C. So there is a linear relationship between the squared rotational speed $\omega$ and the maximum actuator control voltage $U_{max}$ then occurring. The same relationship thus also holds for the parameter p which is proportional to the rotational speed $\omega$. The parameter p may, for example, be a tacho signal of the rotation means. Outputs of measuring means measuring the rotational speed $\omega$ are also suitable for being used as the parameter p.

Additional higher-harmonic components may be added to the actuator control signal during the rotation of an information carrier that has mass-unbalance. These additional higher-harmonic components disturb the linear relationship between a squared rotational speed ω and thus also the p squared and the maximum actuator control voltage $U_{max}$ then occurring. Thus when the first quotient deviates in excess of a predefined threshold from the second quotient, it may be inferred that the information carrier has mass-unbalance. It may be decided to reject, i.e. not to play back an information carrier having a large mass-unbalance.

The rotational speed may be measured in various ways. For example, the bit clock may be used which is derived from the information on the information carrier. Alternatively, a parameter originating from the motor drive of the rotation means may be used, such as a tacho signal.

It may happen that under different circumstances such as, for example, eccentricity or parameters of the actuator used, the quotient $$\frac{U_{\max}}{p^2}$$

varies between different information carriers or between different production designs of the optical device. Since, however, the quotient is determined at various speeds of rotation, the detection means is not adversely by the variation in the quotient $$\frac{U_{\max}}{p^2}$$

when detecting mass-unbalance.

In an embodiment of the optical device, the detection means is capable of carrying out further steps of determining a maximum rotational speed $ω_x$, where a quotient of $U_{max}$ and $ω_x^2$ is in essence equal to a quotient of $U_{max}$ and $ω^2$ at a lower rotational speed ω, the further steps comprising iterations of the steps a, b, and c at various speeds of rotation and comprising a step in which a difference between the first quotient and the second quotient is compared with a first threshold.

The effect of the additional higher harmonic components which disturb the relationship occurs more frequently with higher values of the rotational speed ω. Said embodiment can set the rotational speed ω to a maximum speed at which the effect does not manifest itself. The rotational speed may, for example, be increased repeatedly, and it may be determined at what rotational speed the extent of the disturbances is still permissible. The rotational speed may alternatively be lowered repeatedly, and it may be determined at what speed the extent of the disturbances is no longer impermissible. An advantage of this is that an information carrier having mass-unbalance can be rotated at as high a rotational speed $ω_x$ as possible, without the additional higher harmonic components causing disturbances. These disturbances may give rise to extra noise pollution, vibrations and the like. If an information carrier, without or with relatively little mass-unbalance is accommodated, it is possible for said effect not to occur even at the maximum achievable rotational speed $ω_m$ at which the information carrier is rotated. In that case, repeating the steps may be discontinued and the maximum rotational speed $ω_x$ is equal to said maximum achievable rotational speed $ω_m$.

In a further embodiment, the rotation means comprises a motor which during operation delivers a tacho signal with pulses, a frequency of the tacho signal being proportional to the instantaneous rotational speed ω, the detection means also including:
a first filter means for suppressing components in the actuator control signal with a frequency situated in a range from zero Hertz to a frequency $f_{c1}$ which is substantially lower than the frequency of rotation $f_r$ and for delivering a first filter signal;
a second filter means for suppressing components in the first filter signal with a frequency higher than a frequency $f_{c2}$ which is substantially lower than the bandwidth $f_b$ and for delivering a second filter signal;
a maximum hold means for delivering a max-value signal which is indicative of a maximum value of the second filter signal between pulses of the tacho signal;
a minimum hold means for delivering a min-value signal which is indicative of a minimum value of the second filter signal between pulses of the tacho signal;
a difference determining means for delivering a differential signal which is indicative of a difference between the max-value signal and the min-value signal;
a frequency-to-amplitude converter for delivering an amplitude signal, which amplitude is proportional to the frequency of the tacho signal;
a squaring means for delivering a squared signal which is indicative of a squared amplitude signal;
a divider means for delivering a quotient signal which is indicative of a quotient of a value represented by the differential signal and a value represented by the squared signal, and
a third filter means for suppressing components in the quotient signal with a frequency higher than a frequency $f_{c3}$ which is substantially lower than the frequency of rotation $f_r$ and for delivering a filtered quotient signal; and
where the detection means is capable of utilizing the filtered quotient signal for determining the mass-unbalance.

The first filter means achieves that an offset in the actuator control signal will have little influence on the detection of mass-unbalance. The second filter is instrumental in removing disturbing signals with a relatively high frequency from the first filter signal. A relatively high frequency is meant to be understood as a frequency in a range around the bandwidth of a multiple of the frequency of rotation and upwards thereof. The third filter means brings about a kind of averaging of the quotient signal over a number of rotations of the information carrier. The detection means can be manufactured from standard components in a relatively simple manner.

These and further aspects of the optical device according to the invention will be described hereinafter with respect to the drawings, in which FIG. 1 is an embodiment of the optical device with an information carrier accommodated therein;

Figure 1:
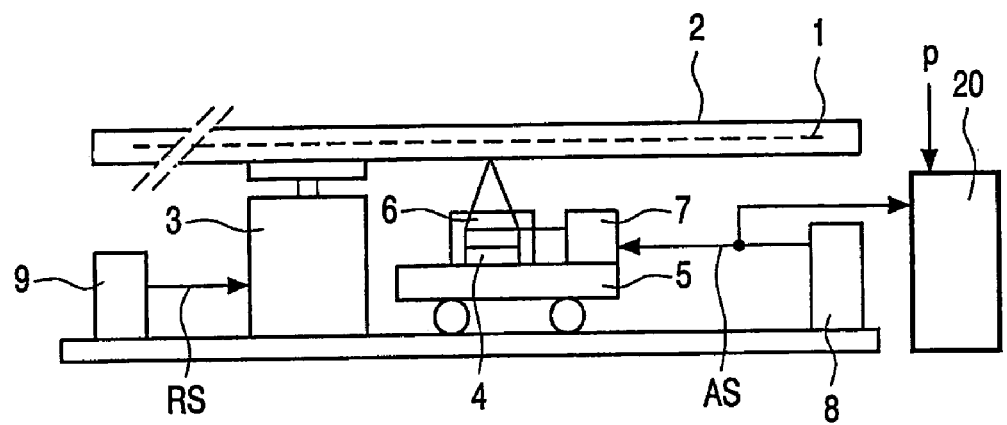
Figure 2:
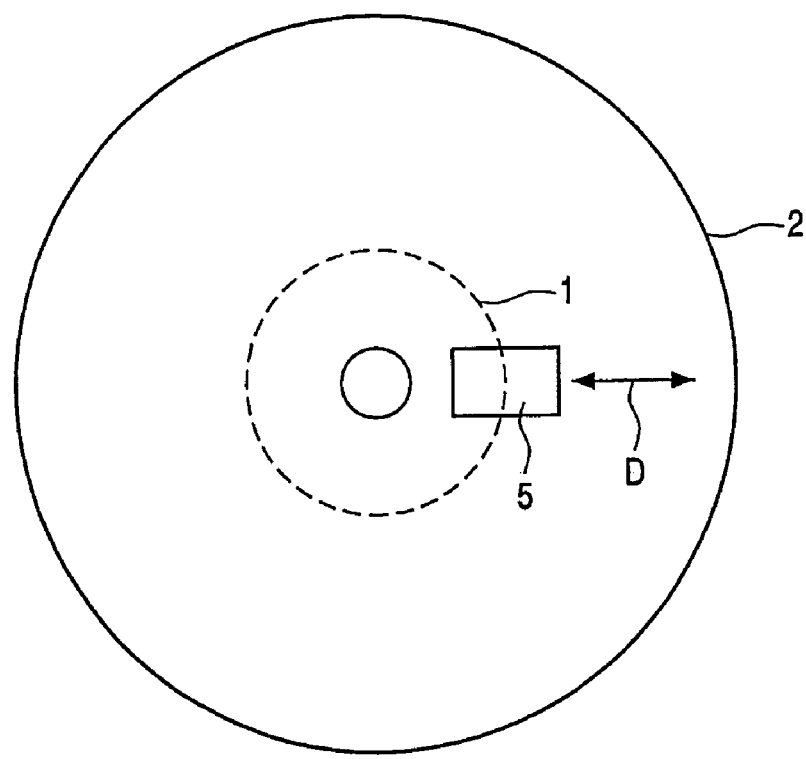
FIG. 2 is the information carrier and the, carriage in plan view.

FIG. 1 shows an information carrier 2 on which a track 1 extends. The track 1 contains information which can be read by the optical device. Furthermore, a rotation means 3 is present. The rotation means 3 is driven by the rotation controller 9 which controls a rotation control signal RS. The radiation source 4 generates a radiation beam. The carriage 5 can be moved in the first direction. The objective 6 is connected to the carriage 5. The actuator 7 can move the objective 6 in a first direction as a function of the actuator control signal AS. The radial controller 8 generates the actuator control signal AS. For detecting the mass-unbalance, the detecting means 20 utilizes the actuator control signal AS and the parameter p. The parameter p may be, for example, an output of a means for measuring the rotational speed $\omega$. FIG. 2 is a plan view of the carriage 5. The arrow D indicates the first direction.

Figure 3:
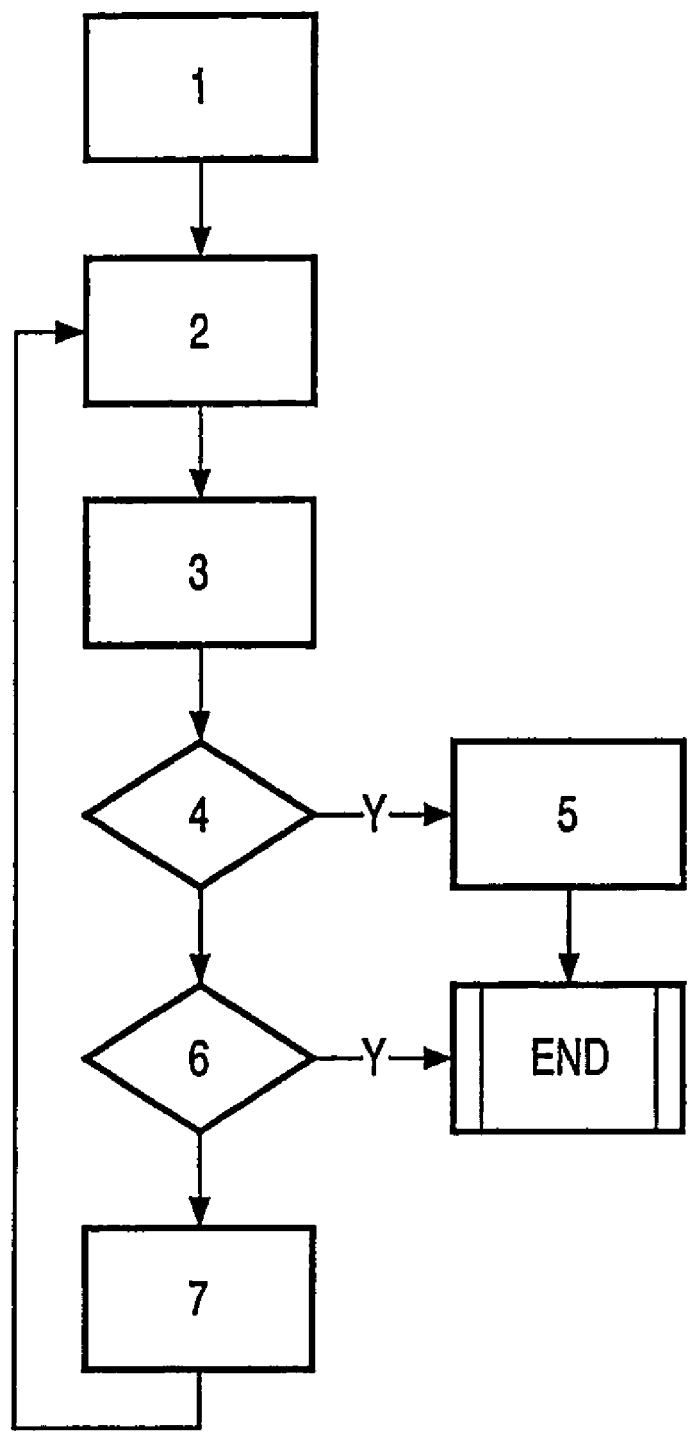
FIG. 3 is a survey of the steps which the detection means can carry out.

FIG. 3 shows steps which the detection means 20 can carry out to establish the maximum rotational speed $\omega_x$, where a quotient of $U_{max}$ and $\omega_x$ squared is in essence equal to a quotient of $U_{max}$ and $\omega$ squared at a lower rotational speed.

Step 1 comprises: making the information carrier 2 rotate at a rotational speed $\omega$; having the radiation beam follow the track 1 with the aid of the actuator 7 and the carriage 5; and determining the maximum value $U_{max1}$ and the value $p_1$ of the parameter p.

Step 2 comprises: making the information carrier 2 rotate at a rotational speed $\omega$+delta, where delta is a jump in the rotational speed; having the radiation beam follow the track 1 with the aid of the actuator 7 and the carriage 5; and determining the maximum value $U_{max2}$ and the value $p_2$ of the parameter p.

Step 3 comprises calculating the absolute value of the difference $$\frac{u_{max2}}{p_2^2} - \frac{u_{max1}}{p_1^2}$$

In step 4, the absolute value from step 3 is compared with the first threshold. If the absolute value exceeds the first threshold, the next step is step 5, otherwise the next step is step 6.

Step 5 brings the rotational speed back to $\omega$-delta. A possible disturbance caused by mass-unbalance has a negligible influence at this rotational speed. So this is the maximum rotational speed $\omega_x$ at which the information carrier 2 can be rotated without disturbances of the mass-unbalance have too large an effect on the optical device. At the next step END the procedure is discontinued.

At step 6 it is sensed whether the current rotational speed $\omega$ is in essence equal to the maximum permissible rotational speed $\omega_m$. If that is the case, the next step is END and the procedure is discontinued. If the current rotational speed $\omega$ is substantially lower than the maximum permissible rotational speed $\omega_m$, the next step is step 7.

Step 7 makes the value $U_{max1}$ equal to $U_{max2}$. The next step is then again step 2.

The rotational speed is thus always increased by a value delta until the absolute difference exceeds the first threshold, or until the maximum permissible rotational speed $\omega_m$ has been reached. In the former case it may be concluded that disturbances caused by mass-unbalance adversely affect the operation of the optical device and the rotational speed $\omega$ is again decreased by delta.

Figure 4:
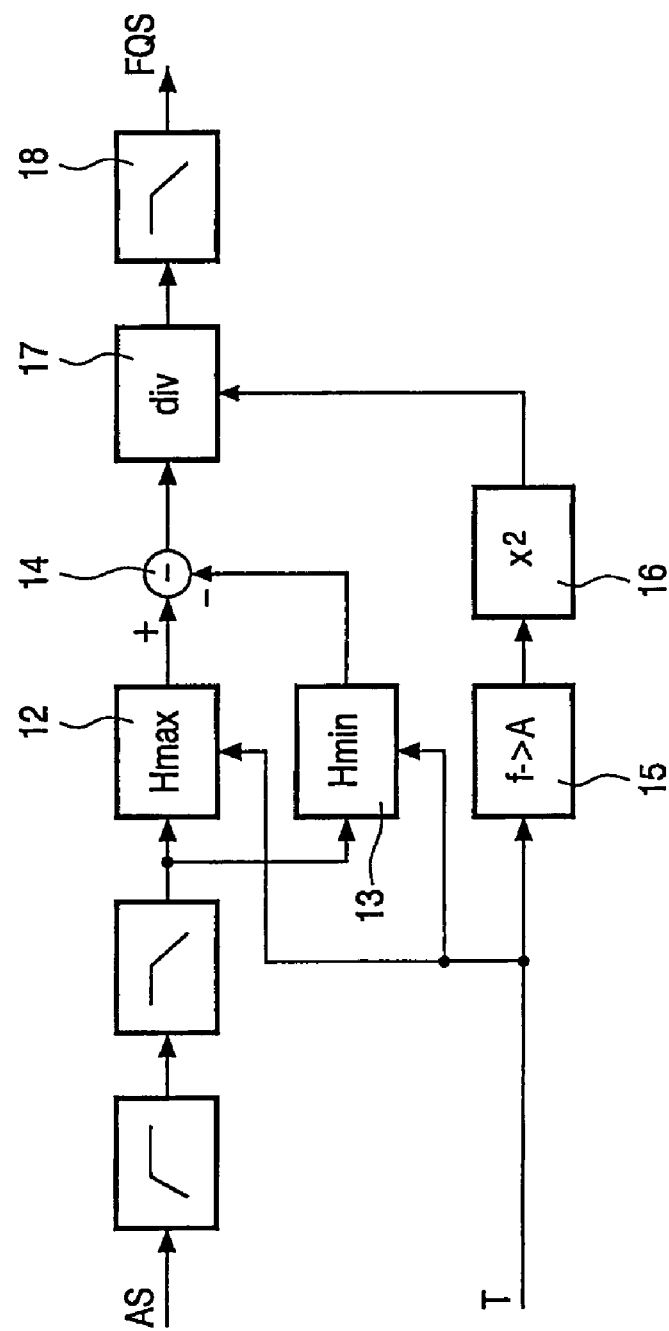
FIG. 4 is an embodiment of the detection means.

In the embodiment of the detection means 20 represented in a block diagram in FIG. 4, the actuator control signal AS is applied to the first filter means 10. The first filter means 10 delivers the first filter signal to the second filter means 11. The second filter signal is applied to an input of the maximum hold means 12 and to an input of the minimum hold means 13. The tacho signal T is applied to other inputs of the minimum hold means 13 and the maximum hold means 12. The minimum value is subtracted from the maximum value by the difference determining means 14. The tacho signal T is applied to an input of the frequency-to-amplitude converter 15. The amplitude of the amplitude signal on the output of the frequency-to-amplitude converter 15 is proportional to the frequency of the tacho signal T. The amplitude signal is applied to the input of the squaring means 16. The quadrature signal is applied to an input of the divider means 17. The divider means 17 determines the quotient of the differential signal and the quadrature signal. The divider means 17 applies the quotient signal to the input of the third filter means 18. The third filter means 18 delivers the filtered quotient signal FQS.

The maximum hold means 12, the minimum hold means 13, and the difference determining means 14 determine an absolute amplitude difference between a minimum value and a maximum value of the amplitude of the second filter signal. An alternative method of determining the amplitude of the second filter signal, however, may be equally satisfactory.

The invention claimed is:

1. An optical device for reading information on a track (1) on a surface of an optically readable information carrier (2) to be accommodated in the device, the device comprising:
rotation means (3) for accommodating and rotating the information carrier (2) with a rotational speed $\omega$, which rotational speed $\omega$ is dependent on a rotation control signal (RS), a parameter p being proportional to the rotational speed $\omega$;
a controller (9) for controlling the rotational speed $\omega$ by controlling the rotation control signal (RS);
a radiation source (4) for generating a radiation beam;
a carriage (5) which can be moved in a first direction (D) transverse to the track (1) and along the surface;
an objective (6) for focusing the radiation beam on the track (1), the objective (6) being connected to the carriage;
an actuator (7) for moving the objective (6) relative to the carriage (5) in the first direction (D) in dependence on an actuator control signal (AS) which has an amplitude U;
a radial controller (8) for keeping the radiation beam in position on the track (1) in the first direction (D) by generating the actuator control signal (AS), the radial controller (8) having a bandwidth $f_b$, and
detection means (20) for determining a mass-unbalance of the information carrier (2), characterized in that the detection means (20) are capable of carrying out the following steps:
a) making the information carrier (2) rotate at a rotational speed $\omega_1$ with the aid of the rotation means (3) and having the radiation beam follow the track (1) with the aid of the actuator (7) and the carriage (5) such that a maximum value $U_{max1}$ of the amplitude U occurs and the parameter p has a value $p_1$;
b) making the information carrier (2) rotate at a rotational speed $\omega_2$ with the aid of the rotation means (3) and having the radiation beam follow the track with the aid of the actuator (7) and the carriage (5) such that a maximum value $U_{max2}$ of the amplitude U occurs and the parameter p has a value $p_2$; and c) comparing a first relation between $U_{max1}$ and $p_1$ with a second relation between $U_{max2}$ and $p_2$ for determining the mass-unbalance.

2. An optical device as claimed in claim 1, characterized in that the first relation in step c is the quotient of $U_{max1}$ and $p_1^2$ and the second relation in step c is the quotient of $U_{max2}$ and $p_2^2$.

3. An optical device as claimed in claim 1, characterized in that the detection, means (20) is capable of carrying out further steps for determining a maximum rotational speed $\omega_x$, where a quotient of $U_{max}$ and $\omega_x^2$ is in essence equal to a quotient of $U_{max}$ and $\omega^2$ at a lower rotational speed $\omega$, which further steps comprise an iteration of the steps a, b, and c at various speeds of rotation and comprise a step in which a difference between the first quotient and the second quotient is compared with a first threshold.

4. An optical device as claimed in claim 1, characterized in that the rotation means (3) comprises a motor delivering a tacho signal (T) with pulses during operation, a frequency of the tacho signal (T) being proportional to the instantaneous rotational speed $\omega$, and the detection means (20) also includes:
- a first filter means (10) for suppressing components in the actuator control signal (AS) with a frequency situated in a range from zero Hertz to a frequency $f_{c1}$ which is substantially lower than the frequency of rotation $f_r$ and for delivering a first filter signal;
- a second filter means (11) for suppressing components in the first filter signal with a frequency higher than a frequency $f_{c2}$ which is substantially lower than the bandwidth $f_b$ and for delivering a second filter signal;
- a maximum hold means (12) for delivering a max-value signal which is indicative of a maximum value of the second filter signal between pulses of the tacho signal (T);
- a minimum hold means (13) for delivering a min-value signal which is indicative of a minimum value of the second filter signal between pulses of the tacho signal (T);
- a difference determining means (14) for delivering a differential signal which is indicative of a difference between the max-value signal and the min-value signal;
- a frequency-to-amplitude converter (15) for delivering an amplitude signal, which amplitude is proportional to the frequency of the tacho signal (T);
- a squaring means (16) for delivering a quadrature signal which is indicative of a squared amplitude signal;
- divider means (17) for delivering a quotient signal which is indicative of a quotient of a value represented by the differential signal and a value represented by the quadrature signal, and
- third filter means (18) for suppressing components in the quotient signal with a frequency higher than a frequency $f_{c3}$ which is substantially lower than the frequency of rotation $f_r$ and for delivering a filtered quotient signal; and
- said detection means (20) being capable of utilizing the filtered quotient signal for determining the mass-unbalance.

* * * * *